Figure 6:
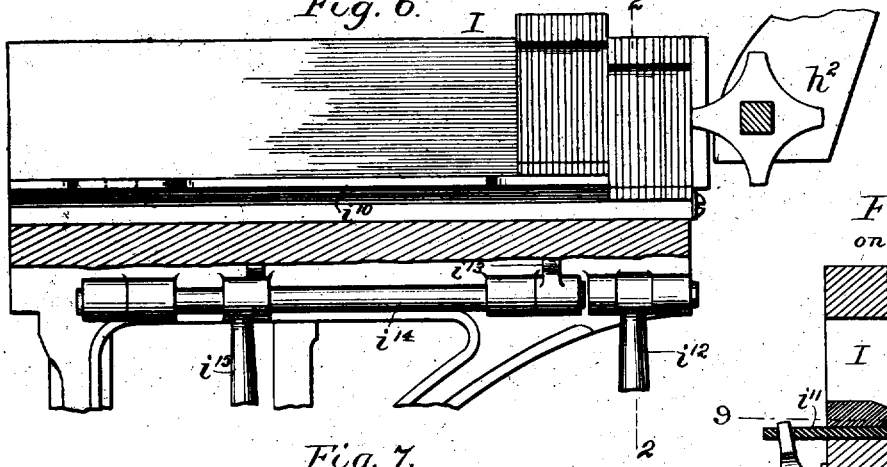

J. R. ROGERS.
LINOTYPE MACHINE.
APPLICATION FILED AUG. 12, 1912.
Reissued Nov. 19, 1912.
13,489.
4 SHEETS—SHEET 1.
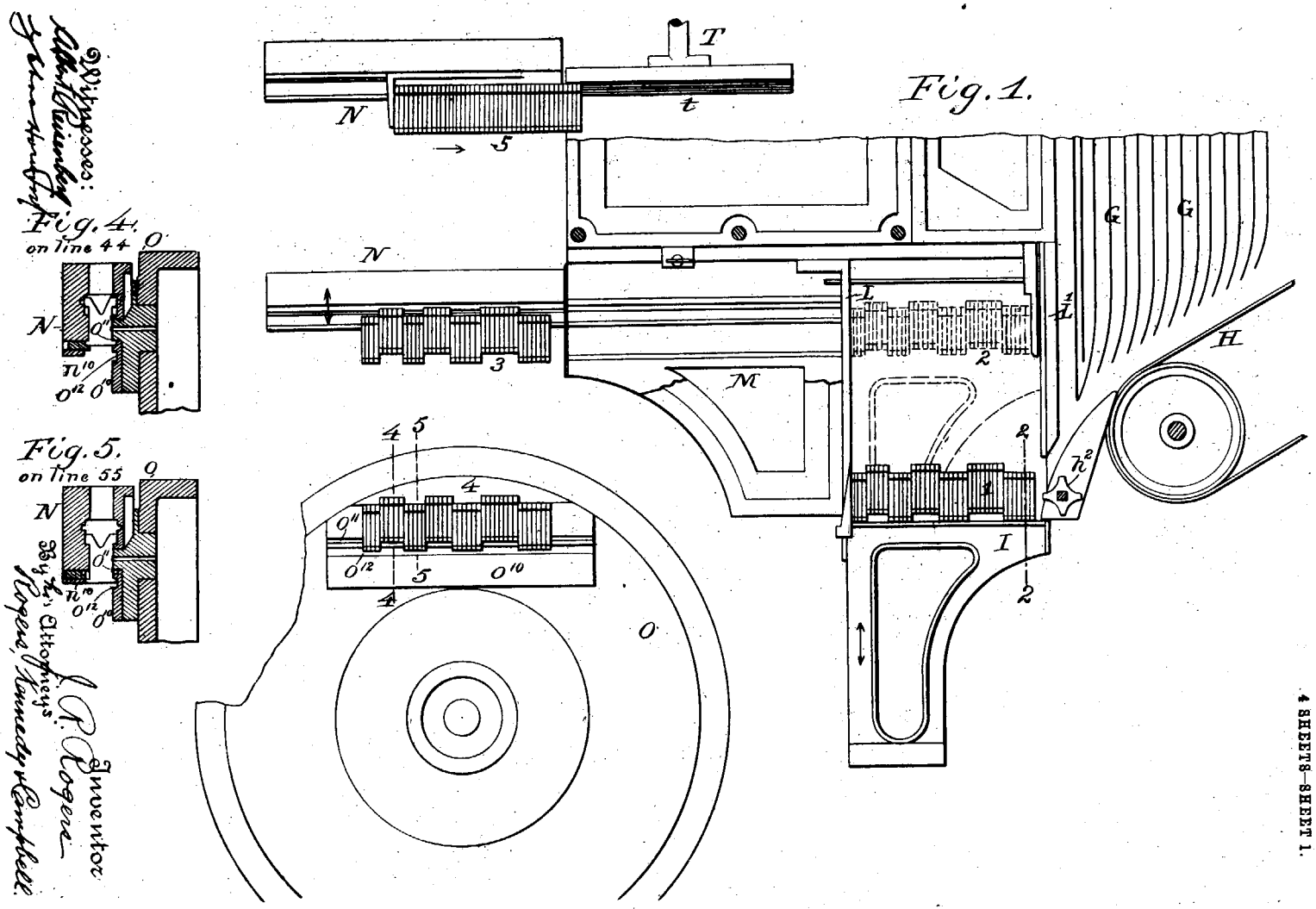
Witnesses:
Albert Reisenberg
J. Chas. Houghton
Inventor
J. R. Rogers
By his Attorneys
Rogers, Kennedy & Campbell.

J. R. ROGERS.

LINOTYPE MACHINE.

APPLICATION FILED AUG. 12, 1912.

Reissued Nov. 19, 1912.

13,489.

4 SHEETS—SHEET 2.

on line 2-2.

on line 9-9.

on line 2-2.

Witnesses:
Albert Eisenberg
Gabriel Horsford

Inventor
J. R. Rogers
By his Attorneys
Rogers, Kennedy & Campbell.

J. R. ROGERS.

LINOTYPE MACHINE.

APPLICATION FILED AUG. 12, 1912.

Reissued Nov. 19, 1912.

13,489.

4 SHEETS—SHEET 3.

Witnesses:
Albert Rosenberg
Geo. Hardwood

Inventor
J. R. Rogers
By his Attorneys
Rogers, Kennedy & Campbell

J. R. ROGERS.

LINOTYPE MACHINE.

APPLICATION FILED AUG. 12, 1912.

Reissued Nov. 19, 1912.

13,489.

4 SHEETS—SHEET 4.

on line 19-19

Witnesses:
Albert Reisenberg
Zebas Howard

Inventor
J. R. Rogers
By his Attorneys
Rogers, Kennedy & Campbell.

UNITED STATES PATENT OFFICE.

JOHN R. ROGERS, OF NEW YORK, N. Y., ASSIGNOR TO MERGENTHALER LINOTYPE COMPANY, A CORPORATION OF NEW YORK.

LINOTYPE-MACHINE.

13,489. Specification of Reissued Letters Patent. Reissued Nov. 19, 1912.

Original No. 615,999, dated December 13, 1898, Serial No. 675,109. Application for reissue filed August 12, 1912. Serial No. 714,748.

*To all whom it may concern:*

Be it known that I, JOHN R. ROGERS, of New York, (Brooklyn,) county of Kings, and State of New York, have invented a new and useful Improvement in Linotype-Machines, of which the following is a specification.

My invention relates to a linotype-machine adapted to produce, in addition to the ordinary body characters, corresponding italic characters, small capitals, black-faced letters, or other secondary characters by the employment of matrices each containing two or more separately-usable characters, as described in Letters Patent issued to Philip T. Dodge on the 8th day of October, 1895, No. 547,633.

My improvements are intended for carrying into effect in a simple and satisfactory manner the improvement disclosed in the above-mentioned patent as applied to a Mergenthaler linotype-machine of the character represented in Letters Patent to O. Mergenthaler, dated September 16, 1890, No. 436,532, and with the exception of the parts described herein and in Patent No. 547,633 the machine may be constructed in all essential particulars in accordance with said Mergenthaler patent or as now in general use.

The parts to which my invention has special reference are intended to coöperate with matrices each having two or more characters at different heights, to select the matrices bearing the required characters and assemble them in line side by side, at the same time determining the elevation of each matrix in order to bring one or another of its characters at the alining-level, as may be required, and, finally, after the casting operation, to restore all the matrices in the line to a common level preparatory to their delivery to the distributing devices, by which they are returned to the upper end of the magazine.

In practice it will happen generally that all of the matrices will be used at the lower level, in other cases that the entire line of matrices will be used at the upper level, and frequently that the majority of the matrices will be used at the lower level, while at one or more points in the line a few matrices representing the special characters will be elevated.

With the exception of the longitudinal adjustment of the matrices the operations of composing the lines, transferring them to the mold, effecting the justification, casting from the composed line, and returning the matrices to the magazine are identical with those performed in the ordinary commercial linotype-machine.

In the accompanying drawings I have represented only such parts as are necessary to an understanding of my invention, and for convenience of reference I have designated the principal parts shown by the same letters as are used in Patent No. 436,532, to which reference may be made for a more detailed description of their construction and operation, if required.

Figure 2:
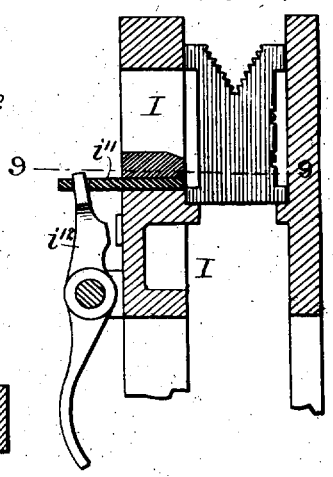
Figure 7:
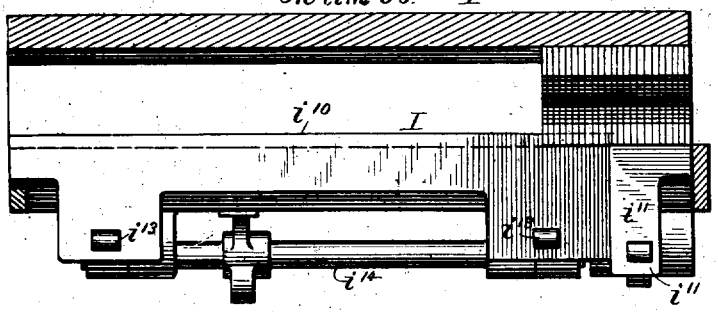
Figure 3:
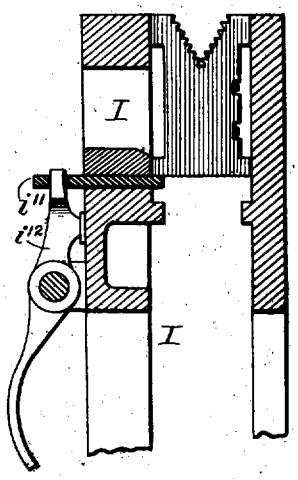
Figure 8:
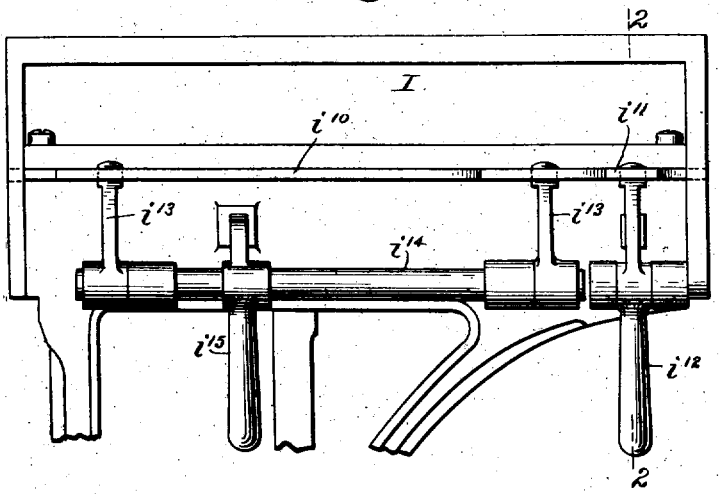
Figure 9:
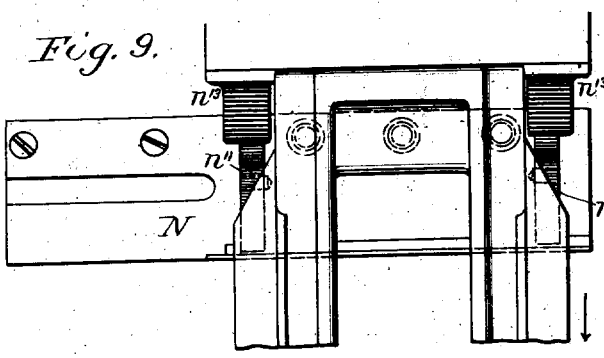
Figure 10:
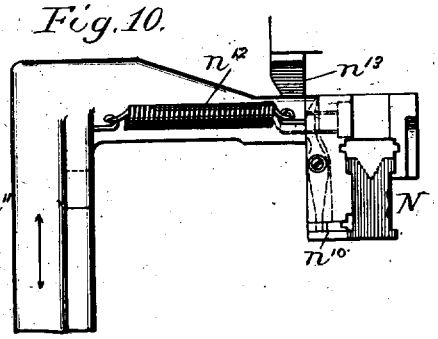
Figure 11:
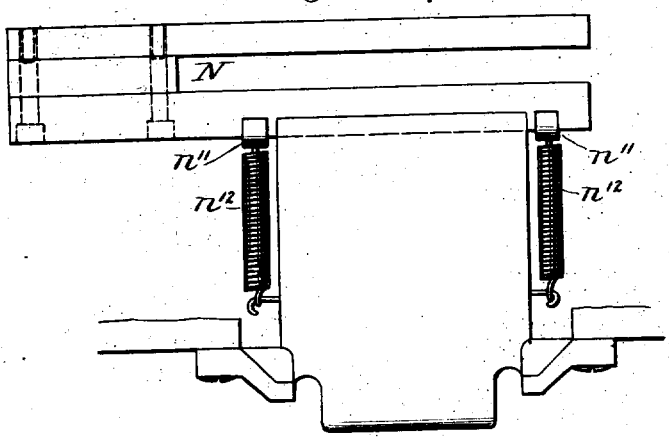
Figure 12:
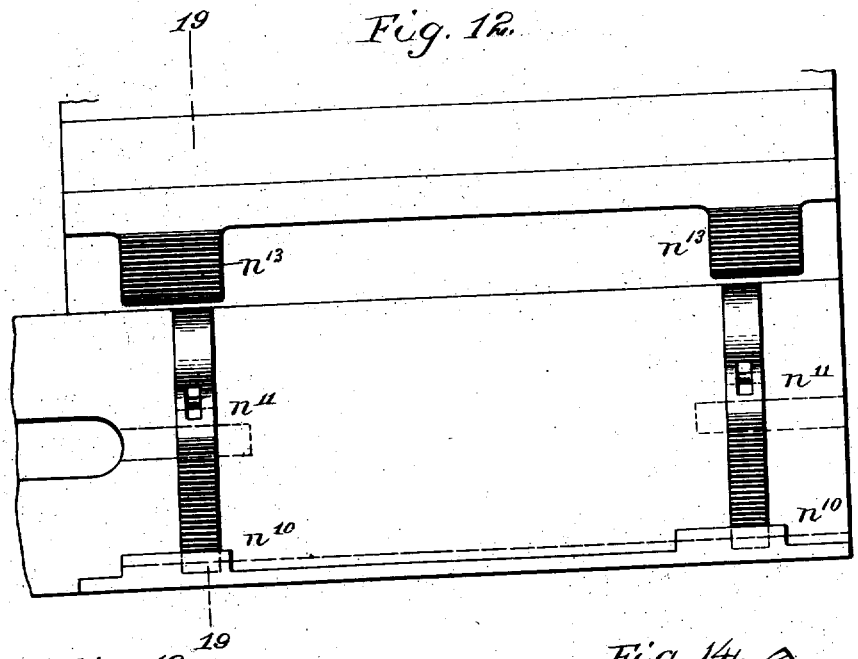
Figure 13:
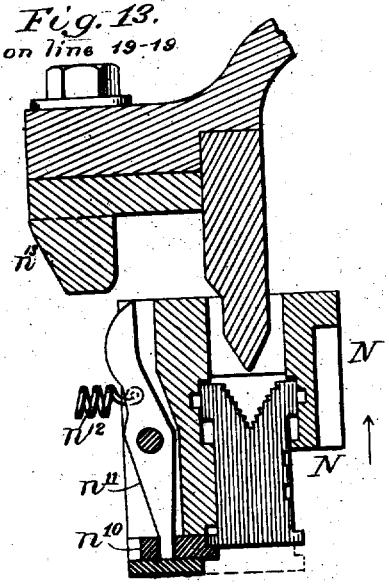

In the accompanying drawings, Figure 1 is a front elevation showing the matrix composing and transferring mechanisms of the ordinary linotype-machine with my improvements incorporated therein. Fig. 2 is a vertical cross-section through the assembling-elevator on the line 2 2 of the preceding figure, showing the matrices in their lowermost position to bring the upper or body characters in line for use. Fig. 3 is a similar section with the parts adjusted to maintain the matrices in the elevated position in the line in order to bring the italic or other special character into use. Figs. 4 and 5 are vertical sections from front to rear on the correspondingly-numbered lines of Fig. 1, showing the matrices in front of the mold in the elevated and lowered positions, respectively. Fig. 6 is a front elevation of the assembling-elevator on a large scale, the front gate or wall being broken away in order to expose the internal parts to view. Fig. 7 is a top plan view of the same, the parts being broken away to the level of the line 9 9 of Fig. 2 in order to expose the horizontal blades or rails by which the matrices are supported in an elevated position. Fig. 8 is a front elevation of the assembling-elevator entire. Figs. 9, 10, and 11 are respectively a front elevation, side elevation, and top plan view of the elevator in which the matrices are carried to the mold and thence to the transfer devices above. Fig. 12 is a front elevation illustrating the manner in which the elevator coöperates with the main frame to permit the final alinement of the matrices preparatory to distribution. Fig. 13 is a cross-section on the line 19—19 of the preceding figure, and Fig. 14 a similar view with the elevator in its highest position and the matrix-supporting blade retracted.

Referring to Fig. 1, G G represent channels through which the matrices descend one at a time from the magazine to the inclined assembling-belt H, from which they are delivered successively in front of the rotary assembling-wheel $h^2$, commonly known as the "star-wheel", by which they are carried forward one after another into the channeled "assembling-elevator" I and added to the line in course of composition, as usual. The usual wedge-shaped spaces or other suitable spaces will also be fed into the line, as usual. After the composition of the line is completed the elevator I is lifted until the line stands on a level with the fixed guide or channel M and between the fingers L and L′ of the transfer-carriage, which latter moves horizontally to the left, carrying the matrix-line through the channel M into the channeled vertically-movable elevator N, commonly known as the "first" elevator. This elevator after receiving the line of matrices is lowered until the line is presented in front of the slotted mold carried in the vertical supporting-wheel O, commonly denominated the "mold-wheel", which moves forward horizontally until the mold proper is in intimate contact with the matrices, as shown in Figs. 4 and 5. After the casting action the mold-wheel retreats horizontally and the elevator N rises until the matrix-line reaches the upper level, (indicated in Fig. 1,) after which the line is pushed horizontally to the right, as indicated by the arrow, until the teeth at the upper ends engage the elevator-bar *t*, commonly known as the "second" elevator, by which the matrices are finally lifted to the distributing mechanism at the top of the machine.

The parts described above and their actions are essentially the same as in the Mergenthaler patent before referred to.

The matrices employed are constructed each with two characters, as described in the Dodge Patents, Nos. 449,872 and 547,633, being in other respects ordinary linotype-matrices.

In order that each matrix entering the line in course of composition may be maintained at a higher or a lower level, according as one or the other of its characters is to be used, I provide the assembling-elevator I, preferably in the forward side, with a longitudinal rib or blade $i^{10}$, so positioned that the lower ear of the incoming matrices may pass thereover or thereunder. If the ears pass below the blade, the matrices stand at the lower level, as shown in Fig. 2 and at the extreme right in Fig. 6, so that their upper or body characters are maintained at the alining-level for presentation to the mold, as shown in Fig. 5. If, however, the ears pass above the blade, the latter serves to sustain the matrices at the higher level, as shown in Fig. 3 and on the left hand in Fig. 6, so that the lower or secondary characters are presented to the mold, as shown in Fig. 4. The blade or rib $i^{10}$ may be fixed in position; but for reasons hereinafter explained it is mounted so that it may be drawn forward beyond its operative position.

In order to determine whether the ears of the incoming matrices shall pass under or over the blade $i^{10}$, I provide at the extreme right of the assembling-elevator, at the point where the matrices enter, a horizontal stop or blade $i^{11}$, adapted to slide inward and outward, or, in other words, forward and backward, under the influence of the hand-lever $i^{12}$, mounted on the front of the assembling-elevator. When this blade is thrust forward, as shown in Fig. 3, it stands in the path of the incoming matrices, which, striking thereon, are arrested in their descent thereby and supported so that as they are crowded to the left by the following matrices they pass upon and are sustained in their elevated positions by the blade $i^{10}$, as shown in Fig. 6. When, however, the blade $i^{11}$ is drawn forward out of the path of the matrices, they will on entering descend to the lower or ordinary level and their ears will, as the line advances, pass below the blade $i^{10}$, as shown at the right hand in Fig. 6. Thus it will be seen the elevation of each matrix entering the line may be determined by moving the blade $i^{11}$ inward or outward. When italics or other secondary characters are needed, it is only necessary to push the blade inward and leave it in position while operating the finger-keys of the machine, as usual. By properly adjusting the blade it is possible to aline all of the matrices at the lower level to produce body characters, or at the higher level to produce the secondary characters, or to introduce into a line of body characters one or more words in the secondary characters, or, if required, a single letter of the secondary form. In short, the adjustable blade or stop enables the operator, without changing the ordinary action of the machine in any other respect, to select for each line characters of either or both forms, as demanded. It will be understood that the secondary characters may be italics corresponding to the body characters or display characters or small capitals. It will also be understood that any two different letters or characters may be used in one matrix if they are of equal width. Thus for convenience the small-capital characters may be placed on matrices bearing figures or numerals or on matrices bearing any other characters of appropriate width, the combination of characters on each matrix being a purely arbitrary matter. For the ordinary letters of the alphabet it is preferred to place the same letter in different forms—for instance, Roman and italic or Roman and blackface—on one matrix.

The blade $i^{10}$ may be made of greater or less width lengthwise of the line, as convenience may dictate. Inasmuch as the matrices have their characters repeated on the back in view of the operator, as usual, it is possible with my contrivance to adjust the blade $i^{11}$ without difficulty, so as to put even single matrices above or below, as demanded.

The long blade $i^{10}$, which is continued to the left side of the assembling-elevator, is mounted to slide forward and backward through the slot in the elevator, and its adjustment is effected by two arms $i^{13}$ on a shaft $i^{14}$, provided with an operating-handle $i^{15}$, as shown in Figs. 7 and 8. This construction admits of the blade being drawn forward beyond the path of the matrices, so as to relieve the latter from any unnecessary wear in the event of their all being used continuously at the lower level.

While I prefer to make the stop $i^{11}$ in the form herein shown, it is to be understood that it may be made in any other form and mounted and operated in any other manner, provided only it serves to determine the elevation of the matrices entering the assembler and passing forward to the line therein. The essence of my invention in this regard resides in the use of a movable stop in the assembling-elevator to coöperate with the assembling devices.

The mold $o$, to which the composed line of matrices is finally presented in order that the matrices may form characters on the slug or line of type cast in the mold, may be of the ordinary construction, except that it should contain, as described in the Dodge Patent, No. 547,633, two horizontal grooves to admit the front ears of the matrices at different levels. Instead of constructing the body of this mold, however, in one piece, with both grooves therein, I prefer the construction shown in Figs. 4 and 5, in which the plate $o^{10}$ is secured to the front of the mold, its upper edge containing a horizontal groove $o^{12}$ to receive the ears of the lower matrices. The upper edge of this plate is rabbeted or cut away in order to leave a second groove $o^{11}$ between it and the under edge of the mold-face to receive the ears of the elevated matrices. The ears of the elevated matrices lie under and against the under edge of the mold-face, by which they are alined.

Figure 14:
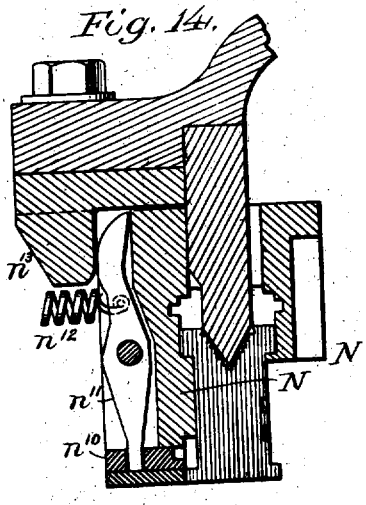

It will be remembered that the composed line is transferred to the first elevator N, which lowers it to the mold. In order that the matrices may be maintained at the levels on which they are assembled until presented to the mold, I mount in the front of the elevator, as shown in Figs. 4, 5, and 9 to 14, a horizontal blade $n^{10}$, free to slide forward and backward. When thrust inward toward the rear of the machine, as shown in Fig. 13, this blade will lie below the ears of the elevated matrices and maintain their elevated positions, while the ears of the lower matrices will pass beneath the blade, and thus it is that the matrices carried horizontally into the elevator from the right hand are properly held. When the elevator lifts the line for presentation to the transfer device, the sustaining-blade $n^{10}$ should be withdrawn in order that the elevated matrices in the line may fall to a level with the remainder, as shown in Fig. 14 and at the top of Fig. 1. This movement of the blade may be effected by any suitable automatic means; but I prefer to employ, as shown in the drawings, two vertical levers $n^{11}$, centrally pivoted in slots in the elevator, their lower ends seated in holes in the blade and their upper ends acted upon by spiral springs $n^{12}$, attached to the elevator-frame, so that they tend constantly to hold the blade inward in operative position. The upper ends of these levers are beveled or rounded, and as the elevator completes its rising movement the levers encounter a fixed projection $n^{13}$ on the main frame, whereby the levers are pushed inward at the upper ends, as shown in Fig. 14, and caused to retract the blade $n^{10}$. Thus it will be seen that the blade is automatically retracted and all the matrices in the line permitted to assume a common level preparatory to their being shifted to the right onto the elevator T. The essence of the invention in this regards lies, first, in the employment of a yielding or spring-supported bar to sustain the matrices in the first elevator, and, second, in the employment of means for automatically effecting the retraction of the bar, and it will be evident to the skilled mechanic that the parts may be varied widely in detail without affecting the mode of action or departing from the limits of my invention.

Having thus described my invention, what I claim is—

1. As an improvement in the Mergenthaler linotype-machine, and in combination with matrices each bearing a plurality of characters, the assembling-elevator, provided with a rib or blade $i^{10}$, to sustain the matrices above the normal level, and a stop or blade, mounted in the elevator and adapted to be set in different positions, to determine the elevation of the incoming matrices.

2. As an improvement in the Mergenthaler linotype-machine, and in combination with matrices each bearing two characters, the assembling star-wheel and the assembling-elevator, provided with a longitudinal rib or blade $i^{10}$, and with a coöperating adjustable blade, or stop, $i^{11}$, independent of the finger-key mechanism of the machine, whereby said stop may be set to cause the delivery of all the incoming matrices at a higher or a lower level, as demanded.

3. In a linotype-machine and in combination with matrices each containing two characters, an assembling mechanism provided with two horizontal blades or stops $i^{10}$ and $i^{11}$, movable into and out of the path of the incoming matrices.

4. In a linotype-machine and in combination with an assembling-elevator, having a horizontal blade or shoulder $i^{10}$, to sustain the matrices above the normal position, a blade or stop $i^{11}$ mounted in the elevator, and the operating-lever therefor.

5. The mold for a linotype-machine, consisting of the slotted body portion and the attached plate $o^{10}$, said mold having one groove formed in the plate and a second groove between the plate and the overhanging shoulder of the body.

6. In a linotype-machine employing matrices with two characters each, an elevator N, provided with a movable blade, to sustain part or all of the matrices above their normal position.

7. In a linotype-machine, the first elevator provided with a movable matrix-supporting blade, in combination with means for automatically retracting the same.

8. In a linotype-machine, the first elevator provided with a movable blade, in combination with spring connections, tending to advance said blade, and positively-acting devices to effect the retraction of the same, substantially as described.

In testimony whereof I hereunto set my hand, this 5th day of August, 1912, in the presence of two attesting witnesses.

JOHN R. ROGERS.

Witnesses:

LUTHER E. MORRISON,
ALBERT REISENBERG.

Copies of this patent may be obtained for five cents each, by addressing the "Commissioner of Patents, Washington, D. C."